United States Patent [19]

Pearce

[11] Patent Number: 5,261,980
[45] Date of Patent: Nov. 16, 1993

[54] FILAMENT-WOUND TUBULAR ELEMENT MANUFACTURING METHOD

[75] Inventor: Terry V. Pearce, Sandy, Utah

[73] Assignee: EDO Sports, Salt Lake City, Utah

[21] Appl. No.: 824,000

[22] Filed: Jan. 22, 1992

[51] Int. Cl.$^5$ .................................. B65H 81/00
[52] U.S. Cl. .......................... 156/173; 156/169;
156/175; 156/86; 156/425; 156/432; 264/101;
264/102; 264/136
[58] Field of Search .............. 156/169, 173, 172, 175,
156/425, 432, 86, 321; 264/101, 102, 136;
249/114.1, 115, 116, 134, 135

[56] References Cited

U.S. PATENT DOCUMENTS

| | | | |
|---|---|---|---|
| 2,602,766 | 7/1952 | Francis | 156/148 X |
| 3,480,498 | 11/1969 | Paul, Jr. | 156/175 |
| 3,676,258 | 7/1972 | Jackson | 156/432 X |
| 3,974,012 | 8/1976 | Hogarth | 156/173 X |
| 4,125,423 | 11/1978 | Goldsworthy | 156/432 X |
| 4,938,824 | 7/1990 | Youngkeit | 156/173 |
| 5,071,506 | 12/1991 | Nelson et al. | 156/175 X |

Primary Examiner—Jeff H. Aftergut
Attorney, Agent, or Firm—Thorpe North & Western

[57] ABSTRACT

A method of manufacturing filament-wound tubes or shafts includes drywinding a plurality of elongate mandrels with the filament, inserting the filament wound mandrels into respective elongate hollow molds of a mold complex, and injecting resin such as epoxy resin under pressure into the hollow molds into intimate contact with the filament. Heat is then supplied to the mold complex to heat the resin to a predetermined temperature and for a predetermined period of time to cure the resin and thereby form the tubes or shafts. The mandrels and tube or shafts are removed from the hollow molds and then the mandrels are removed from the tubes or shafts. Many of these activities are carried out in parallel to increase the manufacturing throughput of the tubes or shafts.

33 Claims, 3 Drawing Sheets

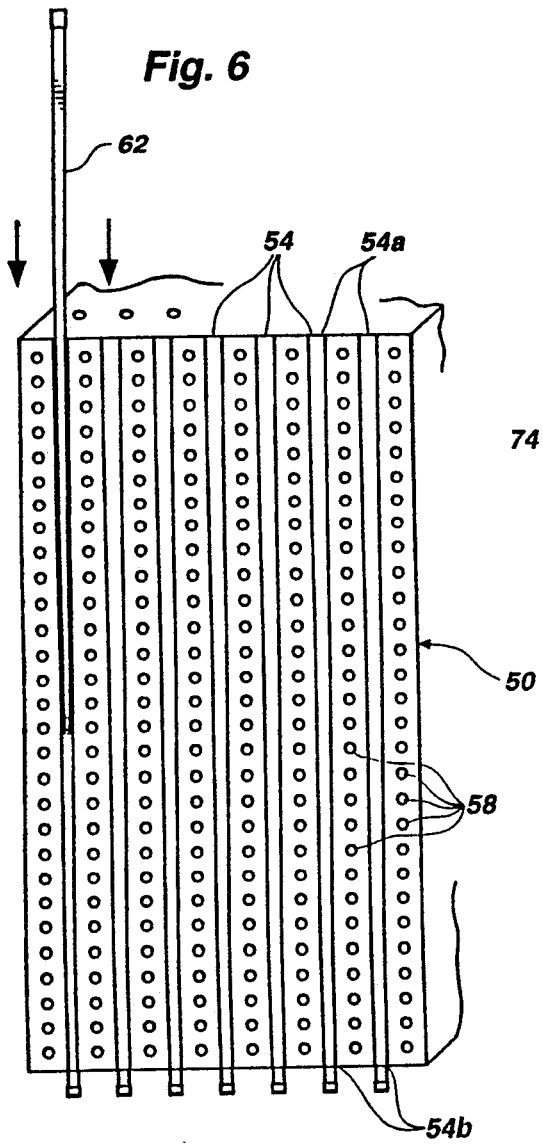
Fig. 6
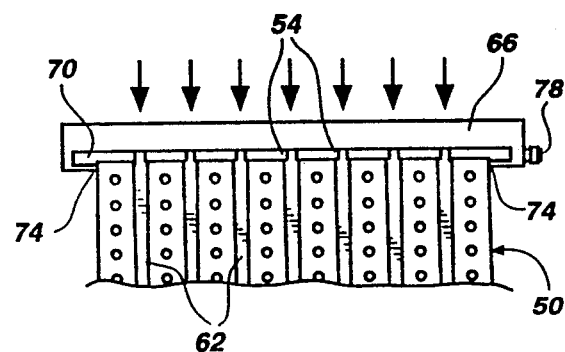
Fig. 7
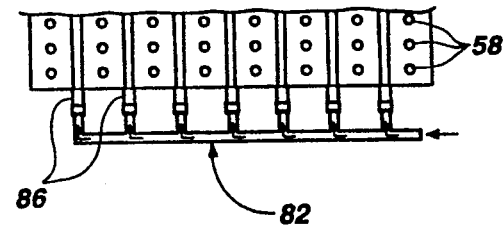

FILAMENT-WOUND TUBULAR ELEMENT MANUFACTURING METHOD

BACKGROUND OF THE INVENTION

This invention relates to both a method of manufacturing tubular elements utilizing filament winding, and the products resulting from such manufacturing.

The use of fiber-reinforced composites in the construction of articles and structural parts has dramatically increased in recent years, and now includes the manufacture of tubular elements and shafts for use, for example, as ski poles, spars for hang gliders and the like, golf shafts, rocket launch tubes, mechanical drive shafts, etc. The reason for this, of course, is the high strength-to-weight ratio achievable with fiber-reinforced composites.

The most commonly used method in manufacturing fiber-reinforced composite tubular shafts is the so-called hand lay up process, carried out either by hand or hand operated machine. In this process, the fiber or filament is formed into strips of tape and then pre-impregnated with resin (or a polymer). The resin is then "staged," or partially cured, after which backing paper is applied to the strips of tape. The pre-preg tape, as it is called, is then ready for storage and/or shipment under refrigerated conditions.

For actual manufacture of the tubular elements with various fiber orientations, the pre-preg tape is cut into wedge-shaped strips leaving, of course, unusable "cookie cutting" leftover portions. The backing paper is removed from the wedge-shaped strips which are then placed onto mandrels either by hand or with a pressure rolling machine, one tube or shaft at a time. Multiple layers of the tape are placed onto the mandrel, all the time attempting to keep track of and locate the seams evenly about the mandrel, until the desired thickness is achieved.

Compacting of the pre-preg tape onto the mandrel is typically then carried out by applying cellophane shrink tape over the surface of the tape layers by a high pressure applicator, after which the tube or shaft is oven cured. After the fiber-reinforced composite material is cured, the mandrel is extracted from the shaft and the cellophane tape is removed (by a scrubber machine). The tube or shaft is then finished by cutting the ends, smoothing the exterior surface by sanding or other grinding method, and coating the surface with urethane or paint.

Another method used in forming the fiber-reinforced composite tubes or shafts involves wet-winding the filament onto mandrels. After the winding is completed, the other steps outlined above for the hand lay up process must also then be carried out for the wet-wound tubes or shafts.

The two above-described methods of manufacturing tubes or shafts are both labor intensive, require a significant amount of manual handling and processing, result in much wasted material, and yield a tube or shaft whose exterior surface generally requires additional finishing, and whose straightness depends on the straightness of the mandrel used.

One method of compacting a composite tube or shaft wrapped on a tapered mandrel, and of curing the composite, is disclosed in U.S. Pat. No. 3,896,206. In this method, the mandrel (with layers of fiber pre-impregnated with resin wound thereabout) is placed in a two-piece mold having an elongate tapered cavity. The mandrel is then forced into the mold to thereby force the composite layers against the sidewalls of the cavity, and compact the composite material onto the mandrel. Although this method serves to provide a smoother finish for the tube or shaft than the earlier-mentioned two methods, parting line marks would still be present on the exterior because of the use of the two-piece mold, and the extensive manual handling and processing for wrapping the pre-impregnated strips on the mandrel would still be required.

SUMMARY OF THE INVENTION

It is an object of the invention to provide a new and improved method of manufacturing fiber-reinforced composite tubular structures.

It is a further object of the invention to provide such a method which requires little manual handling and processing.

It is an additional object of the invention to provide such a method which allows for the manufacture of a plurality of tubular structures essentially simultaneously.

It is a further object of the invention to provide such a method which yields tubular structures having a smooth exterior surface free of parting line marks.

It is also an object of the invention to provide such a method in which the tubular structures are aligned and straightened during the manufacturing process.

It is still another object of the invention to provide such a method in which the tubular structures manufactured are generally consistent from one structure to the other as to physical properties and dimensions.

The above and other objects of the invention are realized in a specific illustrative embodiment of a method of manufacturing fiber-reinforced composite tubular elements which have smooth, glossy surfaces, are straight, and have the desired flex and torque characteristics. The method includes the steps of dry winding one or more elongate mandrels with a selected fiber or fibers, inserting the fiber-wound mandrel into an elongate hollow mold, and injecting epoxy resin under pressure into the hollow molds into contact with the filament.

If more than one mandrel is wound with fiber or fibers, then the fiber-wound mandrels would be inserted into respective elongate hollow molds of a mold complex, for subsequent injection of epoxy resin. Such a mold complex illustratively comprises a block of heat conductive material in which are formed elongate hollow molds, generally in parallel with one another. The mold complex also illustratively includes a plurality of conduits positioned adjacent to the molds for conveying a heat-carrying medium.

The next step in the method, after injecting the epoxy resin into the mold is to heat the mold to thereby heat the epoxy resin to a desired temperature for a sufficient period of time to cure the resin. If a mold complex is used (to cure a plurality of tubular elements), then a heat-carrying medium is supplied to the conduits of the mold complex to thereby heat the mold complex and thus the epoxy resin to the desired temperature. Thereafter, the mandrel or mandrels, with tubes or shafts wound thereabout, are removed from the hollow molds, and then the mandrel or mandrels are removed from the tubes or shafts.

In accordance with one aspect of the invention, the tubes or shafts are wound about tapered mandrels, and then the mandrels, with the tubes or shafts, are inserted, narrow end first, into correspondingly tapered elongate hollow molds. The mandrels are then forced tightly into the molds so that the sides of the molds press against and compact the fiber on the mandrels. Since the side walls of the molds need not contain seams or other irregularities, such compacting of the fiber serves to produce a smooth, unbroken finish on the tube or shaft following injection of the resin and curing thereof.

In accordance with another aspect of the invention, air is evacuated from the molds before or during injection of the epoxy resin to facilitate drawing the resin along the length of the fiber wound portions of the mandrels, and to help eliminate voids.

BRIEF DESCRIPTION OF THE DRAWINGS

The above and other objects and advantages of the invention will become apparent from a consideration of the following detailed description presented in connection with the accompanying drawings in which:

FIG. 6 is a side, cross-sectional view of a mold complex for use in carrying out the method of the present invention;

FIG. 7 is a side, elevational, cross-sectional and fragmented view of a mold complex, illustrating the method of compacting fiber which is wound about mandrels inserted into the mold complex, and illustrating injection of resin into the mold complex and into contact with the fiber;

DETAILED DESCRIPTION

Figure 1:
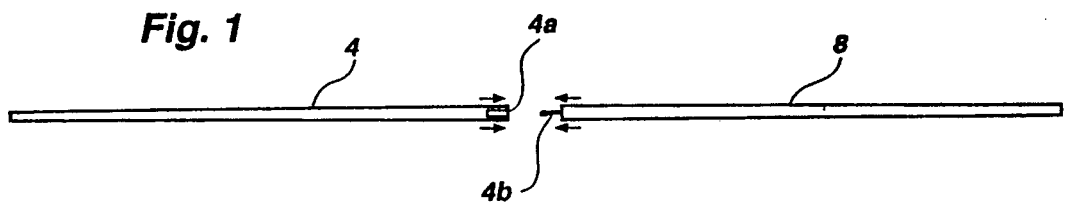
FIG. 1 is a side view showing two elongate mandrels which may be coupled end-to-end for use in practicing the method of the present invention.

In one illustrative embodiment of a method of manufacturing filament wound tubes or shafts, in accordance with the present invention, pairs of tapered mandrels 4 and 8 (FIG. 1) are joined end-to-end in preparation for mounting the mandrel pairs on a filament winding machine. As illustrated in FIG. 1, the mandrels are joined together at their wide ends and so taper to narrower opposite ends. The mandrels 4 and 8 are conventional, typically being made of steel. Any suitable method for joining the mandrels together could be utilized, including screwing a threaded male end into a correspondingly threaded female end, forming one end of one mandrel with a hollow 4a, and the other end of the other mandrel with a plug 4b which would be snugly received into the hollow (as shown in FIG. 1), etc.

Figure 2:
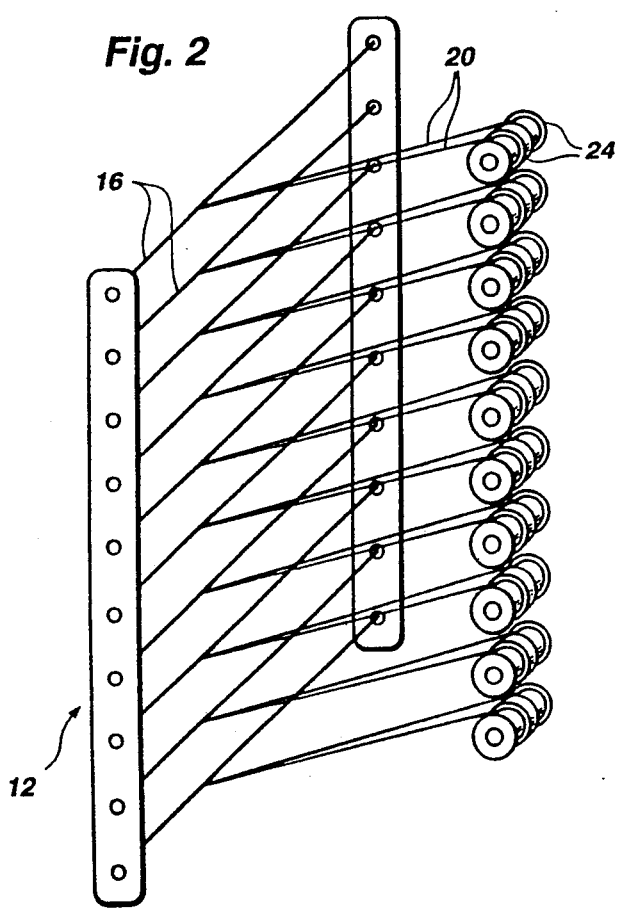
FIG. 2 is a perspective view of apparatus for carrying out the dry-winding portion of the method of the present invention.

FIG. 2 is a perspective view of a representation of a conventional winding machine 12 on which are mounted ten pairs of mandrels 16 joined end-to-end as discussed in connection with FIG. 1. The winding machine 12 is operated in a conventional fashion to dry-wind fibers or filaments 20, from spools 24. The fiber from one of the spool pairs might illustratively be graphite or fiberglass and the fiber from the other spool might illustratively be a stiffener or strength enhancer such as boron. The particular materials or fiber combinations used is not considered part of the present invention, and many different combinations could be selected depending on the desired makeup of the final product.

Figure 3:
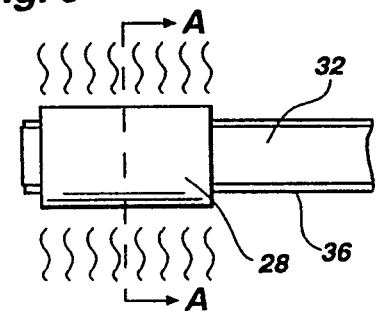
FIG. 3 is a side, fragmented view of a mandrel wound with a fiber-reinforced composite material, with heat shrink tape positioned thereabout.
Figure 4:
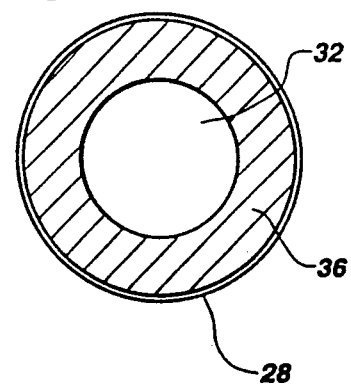
FIG. 4 is an end, cross-sectional view of the mandrel, fiber-reinforced composite, and heat shrink tape combination of FIG. 3, taken along lines A—A.
Figure 5:
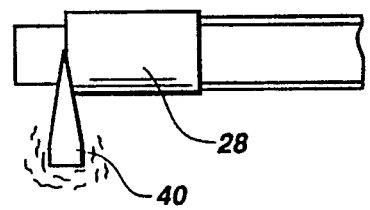
FIG. 5 is a side, fragmented view of a mandrel wound with a fiber-reinforced composite, showing the cutting of the composite at one end.

After the mandrel pairs are wound with the desired number of layers, the mandrel pairs are removed from the winding machine and then cellophane shrink tape (or other type of shrink tape) is applied to the ends of each mandrel pair and to the middle over the joint of each mandrel pair. The tape is heat shrunk in the conventional fashion to secure the fiber ends for cutting and molding as will be discussed momentarily. FIGS. 3–5 illustrate the wrapping with heat shrink tape 28 of a mandrel 32 which is wound with fiber 36. FIG. 4 shows the fiber winding 36 to be significantly thicker than the fiber windings of FIGS. 3 or 5, for illustrative purposes only. After the heat shrink tape is applied and shrunk tightly about the ends and middle of the mandrel pairs, then the ends and middle of the fiber wound tube or shaft are cut, for example, with an ultrasonic knife 40 (FIG. 5) or other suitable cutting implement to thus expose the fiber ends at each end of each tube or shaft, and to allow separating the mandrels of each mandrel pair. The heat shrink tape holds the fibers in place while being cut, and later while being inserted into the molds.

The next step in the process is to separate the ten mandrel pairs into twenty composite-wound mandrels for insertion into a mold complex 50, such as illustrated in side, cross-sectional view in FIG. 6. (Of course, a single mold could be used if speed of manufacture were not a major concern.) The mold complex 50 might illustratively be constructed of a block of heat-conductive material such as aluminum-filled epoxy, in which are formed a plurality of elongate, tapered hollow molds 54. The molds 54 are formed to be generally parallel with one another as shown and to taper from a wider upper end 54a to a narrower lower end 54b. Interspersed to extend generally at right angles between the molds 54 are a plurality of conduits 58 for carrying a heated medium such as oil, water, air, steam, other gas or other flowable heat-carrying medium. The purpose of this is to transfer heat from the heat-carrying medium flowing through the conduits 58 to the hollow molds 54 to thereby heat resin which is injected into the molds to suffuse the fiber which is wound on the mandrels. This will all be discussed momentarily.

Advantageously, the hollow molds 54 are lined with a zinc alloy and coated with polished polytetrafluoroethylene to give the composite tubes or shafts a smooth, glossy surface finish. Alternatively, the molds could be steel lined and coated with a thermoplastic, or made of a high-strength glass such as borosilicate. The conduits 58 might illustratively be copper lined to better transfer heat from the heat-carrying medium to the mold complex body.

Although the mold complex is illustrated in FIG. 6 as being constructed of a solid body 50 in which are formed the hollow molds 54 and conduits 58, the mold complex could alternatively be constructed of a plurality of tapered pipes which would serve as the hollow molds, with the pipes being arranged generally in parallel and immersed in a heat-carrying fluid of some type which, when heated, would transfer heat to the pipes and ultimately to the resin injected into the pipe hollows. Heat conductive gases could also be utilized as the heat-carrying medium, such as air or steam.

The fiber-wound mandrels, such as mandrel 62, are inserted, narrow end first, into respective molds 54, as illustrated in FIG. 6. With the mold complex 50 filled with fiber-wound mandrels, a hydraulic ram 66 (FIG. 7) is placed against the wide ends of the mandrels to force the mandrels tightly into the molds thus causing the walls of the molds to press against the fiber and compact it against the respective mandrels. Such compaction is achieved, of course, because of the tapering of the molds to a degree substantially corresponding to the taper of the mandrels so that the farther into the molds the mandrels are moved, the tighter are the walls against the fiber on the mandrels. In this fashion, the fiber wound about the mandrels is compacted tightly and smoothly against the mandrels. The compaction of the fibers about the mandrels may be accomplished simultaneously for all mandrels inserted into the mold complex 50, resulting in a significant time and labor savings in not having to deal with each mandrel separately.

Insertion of the fiber-wound mandrels into the hollow molds also serves to automatically straighten the mandrels, and thus the fiber-wound tubes or shafts on the mandrels.

An optional next step in the process, following compaction of the fibers, is to evacuate air from the molds 54 and this can be done, for example, by forming a cavity 70 in the hydraulic ram 66 above the mold complex 50 and provide for sealing this cavity at locations 74 from the outside. A port 78 in the hydraulic ram 66, leading to the cavity 70, provides a location through which air from the cavity 70 and thus from the molds 54 may be withdrawn using conventional vacuum producing apparatus.

Either during the evacuation of air from the molds 54, or after, epoxy or other resin is injected into the molds at the lower narrow ends thereof through an injection manifold 82. (Alternatively, the molds could be inserted and the resin injected into the molds at the wider ends thereof.) The injection manifold 82 is coupled by disposable adapters 86 to each of the molds 54, and the resin is supplied to the molds under controlled pressure. Since virtually no air exists in the molds while resin is flowing thereinto, no entrapped voids will be created in the fiber/resin matrices. Advantageously, the fiber layers are formed as helicals (as opposed to hoops) so that resin will readily flow along the fiber paths about the mandrels in an unrestricted fashion.

Figure 10:
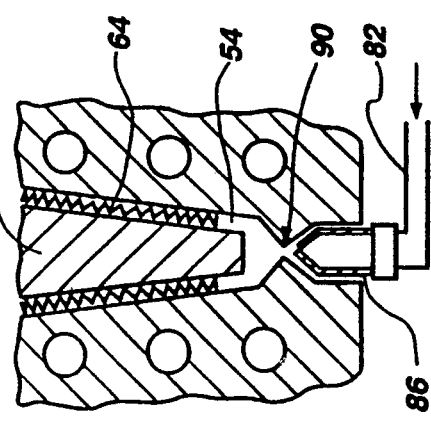
FIG. 10 is a side, cross-sectional and fragmented view of the lower end of a hollow mold showing the positioning of a fiber wound mandrel in the mold and the injection of epoxy or other resin into the mold.

FIG. 10 shows a fragmented, enlarged view of the lower, narrow end of a mold 54 in which is inserted a mandrel 62 with fiber wound thereabout. The lower end of the mold 54 is formed with a constriction 90 through which resin must flow from the manifold 82 and disposable adapter 86 into the mold 54. This constriction 90 forms a breakpoint which, after curing of the resin, provides a location for the easy breaking or separation of the resin in the mold 54 from the resin remaining in the disposable adapter 86.

The disposable adapter 86 may simply be a hollow nozzle for screwing onto and from off the manifold 82. As will be apparent momentarily, resin remaining in the disposable adapter 86 would very likely be cured when curing of the resin in the molds 54 takes place, but resin in the manifold 82 would not be so cured (being spaced some distance from the heat conductive mold complex). After curing, the disposable adapter 86 would be jiggled to break from the cured resin in the mold 54, unscrewed from the manifold 82 and simply thrown away.

After resin has been injected under pressure into the molds 54 (optionally aided by the evacuation of air from the molds), a heat-carrying medium such as oil or gas is circulated through the conduits 58 of the mold complex to heat the resin to a predetermined temperature and for a predetermined period of time sufficient to cure the resin. (Alternatively, the mold complex 50 may be initially heated to a desired temperature and maintained at that temperature while a series of batches of fiber-wound mandrels are inserted into the molds 54 and resin injected thereinto for curing.) Following such curing, the mandrels, with cured fiberreinforced tubes or shafts, are removed from the mold complex 50 by simply pulling the mandrels longitudinally from the molds.

Figure 8:
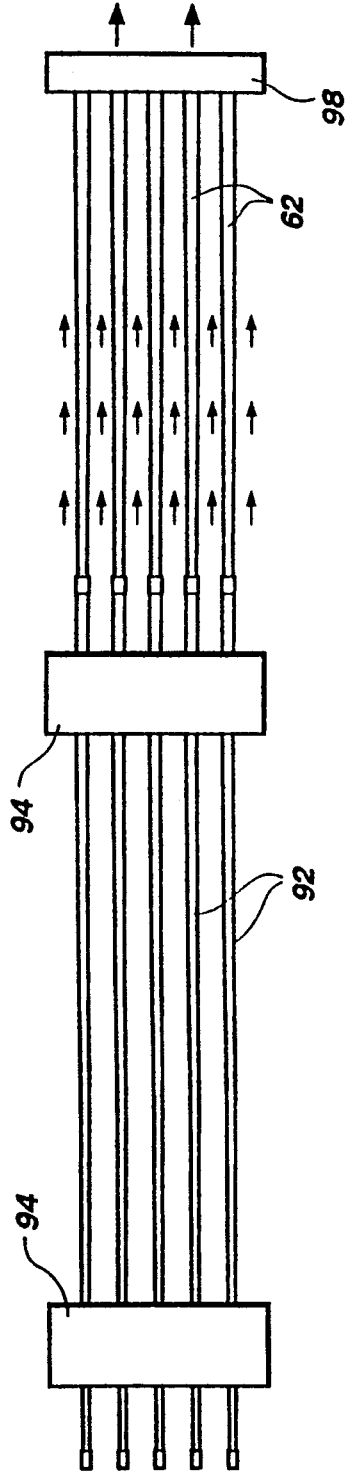
FIG. 8 is a side, elevational view illustrating the removal of mandrels from fiber-reinforced composite tubular elements.

The tubes or shafts are then clamped at both ends in clamps 94 and then the wide ends of the mandrels 62 are clamped by a clamp 98 to allow for pulling on the clamp 98 to thereby remove the mandrels 62 from the fiber-reinforced composite tubes or shafts 92. While still in the clamps 94 (FIG. 9), both ends of the tubes or shafts 92 may be trimmed using a conventional cutting saw. Both the extraction of mandrels (shown in FIG. 8) and the trimming of the tubes or shafts (FIG. 9) may be carried out on a number of tubes or shafts simultaneously, to again save time and labor.

Figure 9:
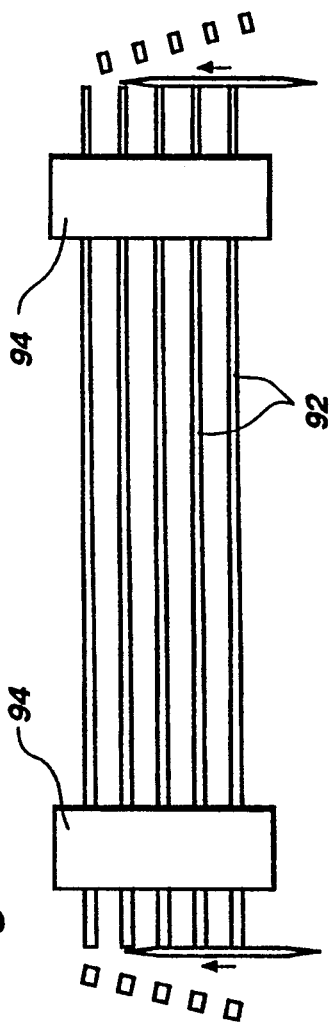
FIG. 9 is a side, elevational view of the tubular elements of FIG. 8, illustrating the cutting of the ends of such elements in accordance with the method of the present invention.

Following trimming of the ends of the tubes or shafts, that is illustrated in FIG. 9, the remaining processes for inspecting and testing the tubes or shafts may be carried out in a conventional fashion.

The resulting fiber-reinforced composite tubular elements manufactured using the method of the present invention have smooth, shiny surfaces requiring no sanding or other finishing, are generally free of voids, are significantly straighter than is possible with prior art methods since the mold complex, during the compacting and curing process, serve to straighten the tubular elements and mandrels, and are consistent as to physical properties (such as flex and torque) and dimensions from one tubular element to another because of the controlled nature of the manufacturing method.

It is to be understood that the above-described arrangements are only illustrative of the application of the principles of the present invention. Numerous modifications and alternative arrangements may be devised by those skilled in the art without departing from the spirit and scope of the and the appended claims are intended to cover such modifications and arrangements.

What is claimed is:

1. A method of manufacturing filament wound tubular elements comprising
    (a) drywinding at least one elongate mandrel with a filament,
    (b) heating a mold complex to a predetermined temperature, the mold complex comprising a block of heat-conductive material in which are formed a plurality of generally parallel elongate hollow molds having sidewalls and a plurality of conduits positioned adjacently between at least some of said molds, by conveying a heated, heat-carrying medium through said conduits to transfer heat to said mold complex and thus to said hollow molds, (c) inserting the filament-wound mandrel into one of said hollow molds to thereby cause said filament-wound mandrel to be heated, (d) injecting resin under pressure into the hollow mold to thereby cause said resin to be heated and to contact the filament and the sidewalls of the mold so that the resin is cured to thereby form a composite tubular element, (e) removing the mandrel and tubular element from the hollow mold, and (f) removing the mandrel from the tubular element.

2. A method as in claim 1 wherein step (a) comprises winding the filament helically.

3. A method as in claim 1 wherein step (a) comprises (g) joining pairs of mandrels end-to-end to form dual mandrels, (h) installing a multiplicity of dual mandrels on a winding machine, and (i) dry winding the dual mandrels with a filament.

4. A method as in claim 3 wherein step (a) further comprises (j) applying shrink tape about the ends of each dual mandrel and about the joint of each dual mandrel where each pair of mandrels are joined end-to-end, (k) heat shrinking the tape, (l) cutting the wound filament at the ends of each dual mandrel under the tape, and at the joint under the tape, to thereby expose filament ends, and (m) separating the dual mandrels into pairs of mandrels.

5. A method as in claim 4 wherein step (1) comprises cutting the wound filament with an ultrasonic knife.

6. A method as in claim 1 wherein step (a) comprises drywinding a plurality of mandrels with a filament.

7. A method as in claim 6 wherein said heat-conductive block of material includes aluminum, and wherein the elongate molds are lined with a zinc alloy coated with a polished polymer.

8. A method as in claim 6 wherein said heat-conductive block of material includes steel, and wherein the elongate molds are lined with a thermoplastic material.

9. A method as in claim 6 wherein step (b) further comprises supplying heated oil to the conduits of the block of material.

10. A method as in claim 9 wherein the conduits are formed of copper tubing.

11. A method as in claim 1 wherein step (a) comprises drywinding a plurality of mandrels with a filament, and wherein step (c) comprises inserting the filament-wound mandrels into respective heat-conductive pipes disposed in a fluid bath, and wherein step (b) comprises heating the fluid bath to thereby heat the pipes and thus resin on the filamentwound mandrels.

12. A method as in claim 11 wherein said pipes are comprised of steel, lined with a polymer.

13. A method as in claim 11 wherein said pipes are comprised of high strength glass.

14. A method as in claim 11 wherein the heated fluid is oil.

15. A method as in claim 11 wherein the heated fluid is air.

16. A method as in claim 1 wherein step (a) comprises drywinding the filament upon a mandrel which tapers from a wide end to a narrow end, wherein step (c) comprises inserting the filament-wound mandrel, narrow end first, into a tapered elongate hollow mold, and wherein the method further comprises forcing the filament-wound mandrel tightly into the mold so that the sides of the mold press against and compact the filament on the mandrel.

17. A method as in claim 16 wherein step (d) comprises withdrawing air from the mold and injecting resin into the mold.

18. A method as in claim 17 wherein air is withdrawn from the mold while resin is injected into the mold.

19. A method as in claim 18 wherein step (d) further comprises orienting the mold generally vertically and injecting resin into the lower end of the mold.

20. A method as in claim 19 wherein step (d) further comprises injecting resin into the mold through a constricted passageway leading to the mold.

21. A method as in claim 1 wherein step (f) comprises clamping both ends of a multiplicity of tubular elements, clamping the ends of mandrels disposed in the multiplicity of tubular elements, and moving the clamp on the mandrels to thereby withdraw the mandrels simultaneously from the multiplicity of tubular elements.

22. A method as in claim 21 further comprising trimming both ends of the multiplicity of tubular elements while held in the clamps.

23. A method of curing fiber reinforced composite tubes wound about respective elongate mandrels comprising the steps of (a) inserting dry wound fiber tubes, with mandrels, longitudinally into elongate hollow molds formed in parallel in a heat conductive mold complex in which are formed a plurality of conduits positioned adjacently between at least some of said molds, (b) compacting the fiber on the mandrels, (c) injecting resin under pressure into the molds to suffuse the fiber wound about the mandrels, (d) supplying heat to the mold complex prior to or during step (c) by conveying a heated, heat-carrying medium through said conduits to transfer heat to said mold complex and thus to said hollow molds to thereby cause said tubes and mandrels to be heated and to heat cure the resin to form fiber composite tubes, (e) removing the composite tubes, with mandrels, longitudinally from the molds, and (f) removing the mandrels from the composite tubes.

24. A method as in claim 23 wherein said molds are tapered longitudinally, wherein said mandrels and dry wound fiber tubes are similarly tapered longitudinally, wherein step (a) comprises inserting the dry wound fiber tubes, with mandrels, narrow ends first, into the wide ends of the molds, and wherein step (b) comprises forcing the dry wound fiber tubes, with mandrels, tightly into the molds so that the walls of the molds press against and compact the fibers wound on the mandrels.

25. A method as in claim 24 wherein a plurality of dry wound fiber tubes, with mandrels, are forced into a corresponding plurality of molds simultaneously.

26. A method as in claim 24 wherein step (c) comprises injecting resin into the molds at the ends which are disposed lower in orientation of the molds.

27. A method as in claim 26 wherein step (c) further comprises injecting resin substantially simultaneously into a plurality of molds.

28. A method as in claim 26 wherein step (c) further comprises injecting resin into the molds through narrowed channels located adjacent the ends of the molds at which the resin is injected.

29. A method as in claim 24 wherein step (c) comprises evacuating air from the molds as resin is injected into the molds.

30. A method as in claim 29 wherein step (c) further comprises injecting resin into the molds while or after evacuating air from the molds.

31. A method as in claim 23 wherein the molds are formed of heat-conductive tubing, and wherein the heat-carrying medium is a fluid.

32. A method as in claim 23 wherein the molds are formed in a heat-conductive block of solid material, and wherein the heat-carrying medium is circulated through conduits formed in the block adjacent the molds.

33. A method as in claim 23 wherein step (f) comprises removing a plurality, of mandrels from a corresponding plurality of composite tubes simultaneously.

* * * * *